Dec. 31, 1957  D. C. MEYERS  2,817,967
AUTOMATIC METERING APPARATUS
Filed April 28, 1955

INVENTOR:
D. C. MEYERS
BY: J. H. McCarthy
HIS AGENT

United States Patent Office 2,817,967
Patented Dec. 31, 1957

2,817,967
AUTOMATIC METERING APPARATUS

Douglas C. Meyers, Hobbs, N. Mex., assignor to Shell Development Company, New York, N. Y., a corporation of Delaware Application April 28, 1955, Serial No. 504,643

4 Claims. (Cl. 73—224)

This invention relates to apparatus for metering liquids and pertains more particularly to an apparatus adapted to meter automatically a fluid such as crude oil wherein it is necessary to compensate for variations in the temperature of the fluid and/or the basic sediments and water content thereof.

During the production of a fluid such as crude oil, it is necessary to meter the fluid several times between the well head, from which the crude oil is obtained, and the refinery where the crude oil is ultimately delivered. The metering of crude oil is complicated by the fact that different batches of crude oil or contents of different tanks will almost always vary in temperature and will often contain different percentages of water and/or basic sediments.

Previously, the amount of oil being produced by a well or delivered to a refinery could be metered by gauging the amount of oil run into a storage tank, taking the temperature of the oil at the time of the measurement, and obtaining a representative sample from the tank at the same time, from which the basic sediments and water content of the oil could be determined by laboratory analysis. Knowing the volume, temperature, and water and sediment content of the oil, the amount of clean oil under standard conditions could be calculated.

In recent times automatic temperature recorders have been used and various types of instruments have been developed for determining and recording the water content of the oil in the tank. Most water-analyzing apparatuses or water-cut recorders that are used at present are of the capacitance type and measure changes in the dielectric constant of the crude oil and water mixture in a tank to determine the water content thereof.

While the necessity of running laboratory analyses to determine the water content of the oil has been overcome by the development of water cut recorders, the amount of clean oil at standard temperature that is delivered from a crude oil measuring tank at each emptying of the tank still has to be calculated by operators from the information obtained by the temperature recorder and the water-cut recorder. Thus, while the volume of liquid being discharged from a measuring tank may be 100 barrels, the amount of clean oil under standard temperature conditions delivered by said measuring tank may be, for example, only 98.37 barrels for one particular measurement and have other values at other times.

It is therefore an object of the present invention to provide an apparatus for automatically metering batches of a fluid which are equal in volume under standard temperature conditions regardless of any changes in temperature which may take place at any time.

A more specific object of the present invention is to provide an apparatus for automatically metering equal increments or batches of the fluid, such as pure crude oil, under standard temperature conditions, regardless of the changes in temperature which may take place during the metering operation and regardless of the amount of contaminating materials, such as basic sediments and water, which may be present in some or all of the metered increments of oil.

These and other objects of this invention will be understood from the following description taken with reference to the drawing, wherein.

Figures 1, 2:
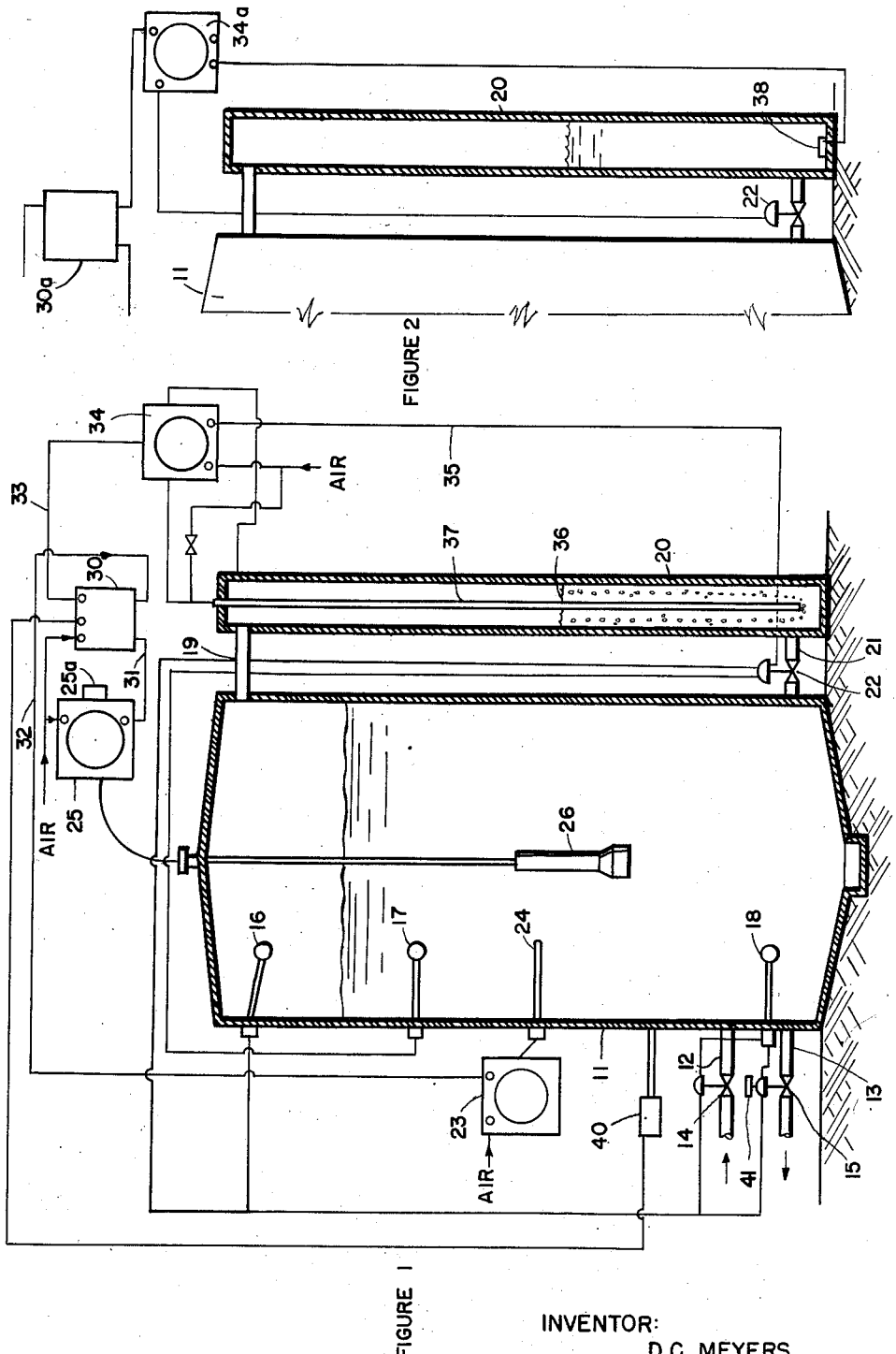
Figure 1 is a diagrammatic view in cross-section of the present automatic metering apparatus together with the necessary control elements.
Figure 2 is a view of a portion of the metering apparatus of Figure 1 provided with electrically operated control elements.

Referring to Figure 1 of the drawing, the automatic metering apparatus of the present invention comprises a storage tank 11 having inlet and outlet ports, 12 and 13, respectively, through which oil may enter or be drained from the tank 11. The flow of a liquid such as oil, into and out of the tank 11 is controlled by inlet and outlet valves 14 and 15, respectively, which are power-operated valves of any suitable type well known to the art, said valves being actuated mechanically, pneumatically, hydraulically, electrically, etc.

The tank 11 is provided with upper, intermediate and lower liquid level-indicating control means of any suitable type well known to the art, for example, float switches 16, 17 and 18. The float switches 17 and 18 of the intermediate and lower liquid level control means are operatively connected to valves 22 and 14, respectively, while float switch 16 of the upper liquid level control means is operatively connected to valves 14, 15 and 22. The size of the metering storage tank 11 is selected so that the actual volume of fluid contained in said tank 11 between the upper liquid level controller 16 and the lower liquid level controller 18 is exactly equal to the desired corrected volume of fluid to be metered by the tank 11 during each filling and emptying cycle of the tank when the temperature of the fluid is at a minimum to be encountered and the percent impurities, for example, when the water content is zero. For example, if it is desired to meter exactly 100 barrels per cycle of oil corrected for basic sediments and water content and referred to a standard temperature of 60° F., the volume of oil adapted to be contained in the tank 11 between the top and bottom floats 16 and 18 of the liquid level controllers is $100 \times 1.000 - (25° F. \times .0004)$ or 99 barrels, if 35° F. is the minimum anticipated temperature of the oil and .0004 is the temperature correction factor.

Positioned adjacent the metering storage tank 11, is an auxiliary or compensating metering tank 20 which is preferably a standpipe or vertically positioned elongated tank of small diameter having its lower end in communication with the lower end of tank 11 through a connecting conduit 21 provided with a control valve 22 for controlling the flow of fluid between the tanks. The tops of the two tanks 11 and 20 are preferably in communication through a conduit 19; however, if desired both tanks may be vented to the atmosphere. The compensating auxiliary tank 20 is of a size such that its maximum volume is at least equal to the difference between the actual volume of the metering tank 11 between the floats 16 and 18 and the desired corrected volume of liquid which is to be handled at maximum temperature conditions, plus the maximum percentage of water to be encountered in the oil being metered. Thus, where the maximum permissible basic sediments and water content in oil being metered for delivery to a refinery is, for example, 1%, then an additional 1% of the corrected volume would be added to the increased percentage, say 2%, needed for temperature compensation. For example, where it is desired to meter 100 barrels of clean oil at the standard temperature of 60° F., the actual corrected volume of liquid when measured at 85° F., would be $100 \times 1.000$ plus $(25° F. \times .0004)$ or 101 barrels, plus 1% of 100 or 1 barrel to compensate for 1% of the water present, the total adding up to 102 barrels. Therefore, the compensating auxiliary tank 20 would have to have a displacement volume of 102 minus 99, or 3 barrels. In this example, the volume temperature correction factor oil, is assumed to be 0.0004 per degree Fahrenheit so that the total maximum compensation volume is 3%, of which 2% is due to temperature variation, and 1% due to water content.

To determine the temperature of the liquid in the metering storage tank 11, the tank 11 is provided with a conventional temperature controller 23 of any suitable well known type having a probe 24 extending into the tank. For example, the temperature controller may be a Mason-Neilan Regulator Company, Norwood, Mass. (1955 Catalog No. 208, page 10) temperature recorder Model 63110 with proportional adjustment for 0–100° F. range. Since the control range in the example used, is from 35° to 85° F., the control point of the instrument would be set at 35° F. and the proportional band set at 50% to give an output air signal by the instrument from 0–10 p. s. i. at 35° to 85° temperature change, if the controls of the automatic metering apparatus are pneumatically operated with a 20 p. s. i. air supply delivered to each of the instruments, as will appear hereinbelow.

In the event that the water is present in the crude oil being metered in the storage tank 11, the tank 11 is provided with a water-indicating device of any suitable well known type, the water indicator 25 having a probe 26 extending down into the tank 11. The water-indicating device may be a resonance bridge null-balance system (such as a Foxboro Capacity Dynalog with a Model 40 pneumatic controller), although an electrical controller may be employed where an electrical control system for the metering tank is being used. A pneumatic controller 25a incorporated with the water-indicating device 25 converts the output signal from the indicating device 25 to a pneumatic signal before transmitting it further.

The signals transmitted by the temperature controller 23 and the water-indicating device 25 are combined by suitable means, such as a device which for ease of illustration in the description of the present invention, is called a computer 30. When the present automatic metering apparatus is operating on pneumatic signals, these signals may be combined by a suitable pneumatic computing relay such, for example, as a "Nullmatic" relay Model 68–1 manufactured by Moore Products Company, Philadelphia, Pennsylvania (Bulletin 681). The computing relay 30 is adapted to receive two or three loading pressures or signals and uses a pneumatic force-balance system to transmit a single modified pressure signal. Depnding upon the assembling and the method of connection to the computer, the signal transmitted to the computer may be added, subtracted, amplified, multiplied, divided, etc.

Thus, in the present system with the temperature controller 23 is adjusted to transmit pressures of from 0 to 10 p. s. i. over a range of from 35 to 85° F., and the water-indicating device 25 adjusted to transmit pressures of from 0 to 5 p. s. i. over a range of 1% water content in the oil, the actual signals coming over lines 31 and 32 from the water cut indicator 25 and the temperature controller 23 are applied to the computer 30 additively. If, on the other hand, the water-indicating device 25 was set to produce a negative signal, for example, a signal of from 5 to 0 p. s. i. over a change in water content of from 0 to 1%, the computer 30 would be set to measure the differential pressure between the two signals transmitted by the temperature recorder 23 and the water cut indicator 25. Any other well known type of differential-pressure transmitter might be used in place of the computer 30 for measuring differential pressure.

The liquid level flow controller 34 is of a conventional type, for example, as Model 62122–2 controller manufactured by Mason-Neilan Regulator Company, Norwood, Mass. (Catalog No. 208, page 10, 1955), adapted to control the valve 22 by signal transmitted through line 35 so that the valve is opened to admit a predetermined amount of fluid into the auxiliary tank 20 or to fill said tank to a predetermined level. The liquid level controller 34 is adapted to sense the liquid level 36 in the auxiliary tank 20 by bubbling air down a tubing 37 to measure the hydrostatic head of fluid in the tank 20. The amount of fluid to be admitted to the tank 20 is preset by the signal received by the liquid level controller 34 from the computer 30.

If the present metering apparatus is to be operated by electrical controls, a temperature controller 23 and a water cut indicator 25 having electrical output signals (Fig. 2) can be employed instead of the ones previously described hereinabove as having pneumatic output signals. The two electrical signals from the temperature indicator 23 and the water cut indicator 25 are there combined in an electrical computer 30a of any suitable type. For example, the computer 30a may comprise an adding circuit similar to those used in electrical analog computers adapted to operate on D. C. input signals, such for example as an adding component manufactured by Philbrick Researches, Inc., Boston, Mass. (Catalog No. K3–A, 1956).

The signal from the electrical computer 30a (Fig. 2) is transmitted to an electrically operating liquid level controller 34a adapted to control the valve 22 between the storage tank 11 and the auxiliary tank 20. The fluid level in the auxiliary tank 20 may be determined electrically in any suitable manner as by use of an electrical pressure transducer 38, for example, of the strain gauge type, transmitting a signal to the combined valve controller and liquid level controller 34a which is proportional to the volume of liquid admitted to the auxiliary tank 20. The controller 34a may be, for example, a Rotax electric controller manufactured by the Foxboro Company, Foxboro, Mass. (Bulletin 427–1, page 18, 1956). The control valve 22 is arranged to open when the voltage of the signals received by the liquid level controller 34a from the adding computer 30a and the electrical pressure transducer 38 are not equal. Instead of employing an electrical pressure transducer 38 to measure the liquid level in the auxiliary tank 20, other electrical liquid level indicating devices, for example, of the capacitance type may be employed. A pneumatic pressure transducer similar to the electrical pressure transducer 38 may likewise be employed in the system illustrated in Figure 1 rather than the liquid level indicating device using tube 37 for bubbling air through the column of fluid in the auxiliary tank 20.

In using the present automatic metering apparatus for metering crude oil in oil field installations, it may also be necessary to compensate for substantial changes in the specific gravity of the oil metered. Normally, such compensation is not necessary as any error due to changes in specific gravity are very small with the present system. For example, if the auxiliary tank 20 contains only 3% of the volume of the storage tank 11, a variation of 10° API in the gravity of the oil would result in a maximum error of only 0.015% of the total volume measured. This error may be reduced, if desired, by employing a gravity responsive transmitter 40, which may be either of the pressure transducer or the differential pressure measuring type, whose output signal is connected to the computer 30 to compensate for changes in the gravity of the liquid. The transmitter 40 may be, for example, an Anubis Model RES–P gravitometer manufactured by American Recording Chart Company, Los Angeles, Calif. (Bulletin No. 111–R3, page 6, 1956).

In the operation of the present automatic metering apparatus, the auxiliary tank 20 is empty when the storage tank 11 is being filled by oil pumped through the inlet valve 14. Valve 22 in the line connecting the storage tank 11 to the auxiliary tank 20 is closed until the fluid level in the tank rises above the probes 24 and 26 and contacts the intermediate liquid level float 17, at which time the tripping of a switch controlled by float 17 causes the valve 22 to open. With the probe 24 of the temperature controller 23 and the probe 26 of the water cut indicator 25 covered by fluid, both probes 24 and 26 transmit signals which are combined by the computer relay 30 and then transmitted to the fluid level indicator 34 which controls the liquid level in the auxiliary tank 20.

To control the liquid level and, in turn, the volume of fluid contained in the auxiliary tank 20, the open tube or pipe 37 is positioned in the tank 20 so that its lower end is at the lower level to be controlled. A small volume of gas is made to flow in the top of the tube and out the bottom thereof, and the back pressure exerted against the bottom of the tube by the hydrostatic head of fluid is reflected in the gas pressure necessary to cause the gas to bubble out the bottom of the tube 37. This gas pressure is connected to the high pressure side of the fluid level controller 34. The vapor pressure in the top of the auxiliary tank 20 is connected to the low pressure side of the controller 34, whereby the pressure differential is made a function of the hydrostatic head of fluid in the auxiliary tank 20. The liquid level in the tank 20 is controlled by the signals received from the computer 30, which in turn is controlled by the variations in temperature and the water content of the fluid being metered in the storage tank 11. The output signal from the fluid level indicator 34 controls the action of the valve in the valve 22 in the line 21 between the metering tank 11 and the auxiliary tank 20.

If the liquid level controller 34 is of the type that operates from, say, 3 to 15 p. s. i., the computer 30 may be set to transmit a constant pressure of 3 p. s. i. when no temperature or water cut correction is needed. Thus, when the compensating volume of liquid to be run into the auxiliary tank 20 is zero, the signal from the computer 30 is 3 p. s. i. which is equivalent to zero on the liquid level indicator 34 and the valve 22 would remain closed. When a maximum compensating volume of fluid must be run into the auxiliary tank 20, the signal from the computer is 15 p. s. i. and the valve 22 would remain open until the correct volume of fluid had been run into the tank 20 at which time the valve 22 closes. Any intermediate volume required in the tank 20 causes the level of liquid therein to be controlled so that the correct amount of fluid is always run into the auxiliary tank 20.

After the correct level of fluid has been established in the auxiliary tank 20, the level of fluid in the metering storage tank 11 continues to rise until it contacts the upper float switch 16 and actuates the inlet valve 14 which is closed while the outlet valve 15 and the valve 22 in the line 21 between the auxiliary tank in the metering storage tank 11 are opened, whereupon the fluid from both tanks is run out to suitable storage tanks (not shown). As soon as the liquid level in the storage tank 11 falls below the lower float switch 18, valves 15 and 22 close while the inlet valve 14 opens, whereupon the storage tank 17 fills again to repeat the cycle. To count the number of batches and hence the amount of fluid metered by the present apparatus, a counter 41 may be provided which is connected to any suitable element of the apparatus, as to the outlet valve 15 thereof, to count the number of times the valve opens, and hence the number of times the storage tank 11 is emptied and filled.

During one cycle of the metering tank the operation of valve 22 is as follows. When the liquid level in the storage tank falls below float 18, the valve 22 is changed from an open to a closed position. Until the liquid level in the storage tank reaches the intermediate float 17, valve 22 remains closed. When the liquid level in the tank reaches float 17, the control of the valve 22 is shifted to controller 34 or 34a but the valve does not open unless the controller has received a signal from the computer 30 or 30a which indicates that liquid should be admitted to the auxiliary tank 20, in which event the valve 22 is opened until the required fluid level is obtained in tank 20, whereupon valve 22 is closed. When the fluid level in the storage tank reaches the upper float 16, control of the valve 22 is taken from the controller and the valve 22 is opened and remains open until the liquid level in the storage tank falls below float 18.

I claim as my invention:

1. Apparatus for automatically metering out equal volumes of a liquid, said volumes being corrected to a standard temperature and standard content of contaminating materials, said apparatus comprising a liquid storage tank having inlet and outlet port means, first and second power-actuated valve means in said inlet and outlet port means respectively, an auxiliary tank adjacent said storage tank, conduit means in communication between said auxiliary and storage tanks near the bottoms of said tanks, third power-actuated valve means in said conduit means, temperature sensing and indicating means responsive to temperatures in the interior of said storage tank to produce a signal proportional thereto, water sensing and indicating means responsive to the water content of a non-aqueous liquid in said storage tank to produce a signal proportional thereto, computer means for combining the signals of said temperature and said water sensing and indicating means and producing a signal proportional to said combined signals, first liquid level controller means for said storage tank including sensing means located above said temperature and water sensing and indicating means, said controller means being arranged to energize said third power-actuated valve means in the conduit means between said tanks, upper and lower liquid level responsive means for said storage tank arranged to open and to close consecutively said first and second power-actuated valve means thereby alternately filling and emptying said storage tank, and liquid level controller means including liquid level sensing means in said auxiliary tank, said last controller means being connected to said computer means and third valve means to close said third valve means when the fluid level in the auxiliary tank rises to a level proportional to the signal received from the computer means.

2. Apparatus for automatically metering out equal volumes of a liquid, said volumes being corrected to a standard temperature and standard content of contaminating materials, said apparatus comprising a liquid storage tank having inlet and outlet port means, first and second power-actuated valve means in said inlet and outlet port means respectively, an auxiliary tank adjacent said storage tank, conduit means in communication between said auxiliary and storage tanks near the bottoms of said tanks, third power-actuated valve means in said conduit means, temperature sensing and indicating means responsive to temperatures in the interior of said storage tank to produce an electric signal proportional thereto, water sensing and indicating means responsive to the water content of a non-aqueous liquid in said storage tank to produce an electric signal proportional thereto, computer means for combining the signals of said temperature and said water sensing and indicating means and producing an electric signal proportional to said combined signals, first liquid level controller means for said storage tank including sensing means located above said temperature and water sensing and indicating means, said controller means being arranged to open said third power-actuated valve means in the conduit means between said tanks, upper and lower liquid level responsive means for said storage tank arranged to open and to close consecutively said first and second power-actuated valve means thereby alternately filling and emptying said storage tank, and liquid level controller means including liquid level sensing means in said auxiliary tank, said last controller means being connected to said computer means and third valve means to close said third valve means when the fluid level in the auxiliary tank rises to a level proportional to the signal received from the computer means.

3. Apparatus for automatically metering out equal volumes of a liquid, said volumes being corrected to a standard temperature and standard content of contaminating materials, said apparatus comprising a liquid storage tank having inlet and outlet port means, first and second power-actuated valve means in said inlet and outlet port means respectively, an auxiliary tank adjacent said storage tank, conduit means in communication between said auxiliary and storage tanks near the bottoms of said tanks, third power-actuated valve means in said conduit means, temperature sensing and indicating means responsive to temperatures in the interior of said storage tank adapted to produce a pneumatic signal proportional thereto, water sensing and indicating means responsive to the water content of a non-aqueous liquid in said storage tank to produce a pneumatic signal proportional thereto, computer means for combining the signals of said temperature and said water sensing and indicating means and producing a pneumatic signal proportional to said combined signals, first liquid level controller means for said storage tank including sensing means located above said temperature and water sensing and indicating means, said controller means being arranged to open said third power-actuated valve means in the conduit means between said tanks, upper and lower liquid level responsive means for said storage tank arranged to open and to close consecutively said first and second power-actuated valve means thereby alternately filling and emptying said storage tank, and liquid level controller means including liquid level sensing means in said auxiliary tank, said last controller means being connected to said computer means and third valve means to close said third valve means when the fluid level in the auxiliary tank rises to a level proportional to the signal received from the computer means.

4. Apparatus for automatically metering out equal volumes of a liquid, said volumes being corrected to a standard temperature and standard content of contaminating materials, said apparatus comprising a liquid storage tank having inlet and outlet port means, first and second power-actuated valve means in said inlet and outlet port means respectively, an auxiliary tank adjacent said storage tank, conduit means in communication between said auxiliary and storage tanks near the bottoms of said tanks, third power-actuated valve means in said conduit means, temperature sensing and indicating means responsive to temperatures in the interior of said storage tank adapted to produce a signal proportional thereto, water sensing and indicating means responsive to the water content of a non-aqueous liquid in said storage tank to produce a signal proportional thereto, computer means for combining the signals of said temperature and said water sensing and indicating means and producing a signal proportional to said combined signals, first liquid level controller means for said storage tank including sensing means located above said temperature and water sensing and indicating means, said controller means being arranged to energize said third power-actuated valve means in the conduit means between said tanks, an open conduit in communication between the tanks near the upper end thereof, upper and lower liquid level responsive means for said storage tank arranged to open said first power-actuated valve means thereby filling said storage tank and to close said first valve means while opening said second and third valve means to empty said storage and auxiliary tanks, and liquid level controller means including liquid level sensing means in said auxiliary tank, said last controller means being connected to said computer means and third valve means to close said third valve means when the fluid level in the auxiliary tank rises to a level proportional to the signal received from the computer means.

References Cited in the file of this patent

UNITED STATES PATENTS

| | | |
|---|---|---|
| 2,158,381 | Raymond | May 16, 1939 |
| 2,505,905 | McAfee | May 2, 1950 |
| 2,633,750 | Langstaff | Apr. 7, 1953 |